US007448828B2

(12) United States Patent
Augenstein et al.

(10) Patent No.: US 7,448,828 B2
(45) Date of Patent: *Nov. 11, 2008

(54) LANDFILL DESIGN AND METHOD FOR IMPROVED LANDFILL GAS CAPTURE

(75) Inventors: Don Churchill Augenstein, Palo Alto, CA (US); John Rudiger Benemann, Walnut Creek, CA (US); Ramin Yazdani, Davis, CA (US)

(73) Assignee: Institute for Environmental Management, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/710,625

(22) Filed: Feb. 23, 2007

(65) Prior Publication Data

US 2007/0243023 A1    Oct. 18, 2007

Related U.S. Application Data

(63) Continuation of application No. 11/187,639, filed on Jul. 22, 2005, now Pat. No. 7,198,433, and a continuation-in-part of application No. 10/138,617, filed on May 3, 2002, now abandoned.

(60) Provisional application No. 60/589,860, filed on Jul. 22, 2004, provisional application No. 60/288,624, filed on May 3, 2001.

(51) Int. Cl.
    *B09B 5/00*  (2006.01)
(52) U.S. Cl. .............................. 405/129.95; 405/129.57
(58) Field of Classification Search ............ 405/129.95, 405/129.9, 129.57
    See application file for complete search history.

(56) References Cited

U.S. PATENT DOCUMENTS

| 4,442,901 | A | | 4/1984 | Zison |
| 4,444,041 | A | | 4/1984 | Zison |
| 4,469,176 | A | | 9/1984 | Zison |
| 5,063,519 | A | | 11/1991 | Zison |
| 5,090,843 | A | * | 2/1992 | Grigsby .................. 405/129.9 |
| 5,335,535 | A | * | 8/1994 | Ruthrof et al. ............... 73/40.7 |
| 5,857,807 | A | * | 1/1999 | Longo, Sr. .............. 405/129.7 |
| 6,283,676 | B1 | * | 9/2001 | Hater et al. ............ 405/129.57 |
| 2003/0008381 | A1 | * | 1/2003 | Augenstein ................. 435/266 |
| 2005/0201831 | A1 | * | 9/2005 | Lee et al. ............... 405/129.95 |

* cited by examiner

*Primary Examiner*—John Kreck
(74) *Attorney, Agent, or Firm*—Hugh McTavish

(57) ABSTRACT

The invention provides an improved method of collecting biogas from a landfill that results in more complete collection of biogas produced in the landfill, and with less contamination with air. The method involves providing the landfill with an upper gas containment layer near the surface of the landfill to retard biogas escape and air entrainment into the landfill. Underneath the gas containment layer is provided a gas-permeable conductive layer. Underneath the conductive layer, a well withdraws biogas from the landfill. Withdrawal of biogas from the well creates a partial vacuum that draws gas from the gas-permeable conductive layer down through the waste mass to the well. If the rate of gas withdrawal from the well is too rapid, air will be entrained from the atmosphere into the gas-permeable conductive layer. But if the rate of gas withdrawal from the well is too slow, biogas may percolate through the gas-containment layer and the surface of the landfill to escape. Monitoring the gas composition of the gas-permeable layer allows one to determine quickly and continuously whether the rate of gas withdrawal from the well is too fast or too slow.

16 Claims, 5 Drawing Sheets

US 7,448,828 B2

LANDFILL DESIGN AND METHOD FOR IMPROVED LANDFILL GAS CAPTURE

This application is a continuation application under 35 U.S.C. § 120 of U.S. utility patent application Ser. No. 11/187,639, filed Jul. 22, 2005 now U.S. Pat. No. 7,198,433, which claims priority from U.S. provisional patent application Ser. No. 60/589,860, filed Jul. 22, 2004. This application claims benefit of priority as a continuation-in-part application under 35 U.S.C. § 120 of U.S. utility patent application Ser. No. 10/138,617, filed May 3, 2002 now abandoned, and of provisional patent application Ser. No. 60/288,624, filed May 3, 2001. All these patent applications are incorporated by reference.

BACKGROUND

Landfilling and landfill gas. Landfilling and dumping dominate waste disposal in the United States, as well as waste disposal worldwide. The US EPA estimates US landfilling of Municipal Solid Waste ("MSW") at about 160 million tons annually over the past few years (US EPA 2002) And, worldwide, even greater tonnages of organic solid wastes, several-fold those of the US, are landfilled and otherwise buried in dumps around the world In wastes either buried in landfills or simply dumped, organic components decompose to form "landfill gas" (LFG) or biogas. LFG (biogas) comprises approximately equal volumes of methane and carbon dioxide, with lesser amounts of other gases and moderate levels of pollutants. A representative reaction for methane generation from cellulose, the largest fraction of most organic waste, is:

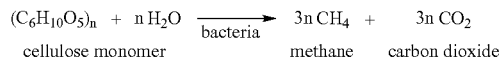

Importance of Landfill Gas Recovery.

The landfill gas ("LFG") has pronounced environmental impacts, and its recovery is of extremely high importance across the United States (US), and worldwide, for a variety of related reasons:

1. Mitigating climate or "greenhouse" effect The climate or "greenhouse" effect of methane emitted from landfills is a major global concern, simply because of enormous amounts of organic wastes, hence methane emissions, involved. In climate terms, methane from landfills adds to (makes a difference of) 3 to 10% in the annual increase in radiative forcing due to buildup of all greenhouse gases in earth's atmosphere. In more simplified terms, the presence or absence of landfill methane emissions into the atmosphere can be considered to make a difference of about 3 to 10% in the "greenhouse effect"
2. Potential for renewable LFG energy The landfill methane recovered from landfills can be important as a fuel. It is usable with existing technology and equipment (Augenstein and Pacey, 1992). Available US landfill methane, potentially recoverable (as of now, based on the US Energy Information Agency (EIA) and other statistics) but not exploited for energy, conservatively equates to energy value of over 150,000 barrels of oil a day.
This amount of energy is significant in terms of improved national security and energy self-sufficiency for the US. Furthermore, because methane from wastes is nearly all from photosynthetically fixed carbon, this methane is a renewable fuel. It displaces the use of fossil carbon fuels, thereby lessening climate effects of fossil $CO_2$.
3. Other important reasons for landfill gas capture. Other important reasons for landfill gas control and recovery include (a) need to mitigate methane effects on stratospheric ozone destruction, (b) prevent emission of local air pollutants, (c) mitigation of landfill methane migration and explosion hazards, and mitigation of odor problems, and (d) desires of the United States to develop practical, economic and cost-effective options for voluntary or non-voluntary greenhouse gas abatement actions, and practical options for carbon sequestration.

For all of these reasons, the recovery of landfill gas at high efficiency is a high priority to regulators as well as landfill owners and operators.

Notwithstanding the potential benefits of methane recovery, "conventional" landfill gas extraction, by the dominant EPA and state-accepted approach, is relatively inefficient.

Conventional Gas Extraction with Wells or Trenches

The usual gas recovery approach is to use deep wells attached to a network of pipes and a gas pump (blower) that applies vacuum to extract the gas from waste. To illustrate performance of conventional systems, gas flow dynamics with "conventional" well (or trench) extraction are shown qualitatively in FIG. 1. FIG. 1 shows landfill 1 containing waste 2. A well 3 collects biogas from the landfill. Cover layers 4 are in contact with the atmosphere at the surface of the landfill. Arrows in FIG. 1 denote directions of gas fluxes, through (in and out of) a waste landfill surface, and within the waste. Gas flow velocity is denoted qualitatively by lengths of the arrows. Note the gas escaping to the atmosphere far from the wells. It is principally because of this LFG emission and loss far from the wells that gas capture is typically 60-85% (SWANA 1994. Solid Waste Association of North America Workshop on Landfill Gas Modeling and Recovery, 1994. Personal communications from participants). This inefficiency is acknowledged and estimated at 75% by the US EPA (EPA, Peer et al. 1991, ICF, 2002) and California Air Resources Board. The inefficiency has been an accepted feature of extraction.

The profile of surface emission flux is recognized to lead to potential for some emissions away from the wells under most circumstances. Note also that there is almost always entrainment of gas, whether LFG or atmospheric air, through the surface area most proximate to deep collection. Both LFG emission far from wells, and air entrainment proximate to subsurface ion, are well recognized as deleterious to collection efficiency. A "tradeoff" exists between extracting or "pulling" at too high a flow rate and entraining excessive atmospheric air, and pulling too little and recovering less LFG. This poses one dilemma of conventional extraction.

Geomembrane over highly conductive layer: Zison. An invention that partially ameliorates inefficiency and air entrainment problems of gas collection by wells has been to collect by a surface geomembrane or a low permeability layer over a surface or near-surface highly conductive layer. (Zison, U.S. Pat. No. 4,442,901). A schematic of the Zison highly conductive layer recovery method is shown in FIG. 2. In FIG. 2, biogas is emitted by digestion of waste 2. The arrows show flux of the gas. Overlying the bulk of the waste is a gas-permeable layer 5. A surface geomembrane 6 is used to prevent gas escape from the gas permeable layer. Biogas is extracted (arrow 21) from the gas permeable layer 5.

New landfill designs that facilitate collection of landfill gas (biogas), and new methods of collecting biogas generated in landfills are needed. Preferably the methods and designs will allow for more efficient collection of biogas than previous methods (i.e., allowing less biogas to escape). Preferably the methods and designs also minimize collection of atmospheric air with the biogas and minimize the drawdown of air into landfills. Air contamination harms the quality and utility of collected biogas, and air drawn into a landfill creates a more oxidizing environment in the landfill that leads to consumption of methane by oxidation and inhibits the anaerobic microbial fermentation that produces biogas.

SUMMARY OF THE INVENTION

The invention provides an improved method of collecting biogas from a landfill that allows biogas to be very efficiently collected while minimizing entrainment of air into the landfill and into the collected biogas. Landfill designs and modifications that facilitate the method are also disclosed.

The method involves providing the landfill with an upper gas containment layer near the surface of the landfill to retard biogas escape and air entrainment into the landfill. Underneath the gas containment layer (or closer to the landfill interior or center from the gas containment layer) is provided a gas-permeable conductive layer. Underneath the conductive layer (or, again, closer to the landfill waste mass center), a well withdraws biogas from the landfill. This system results in efficient capture of biogas from the landfill, with minimal air contamination of the biogas. Because the biogas passes from the gas-conductive layer through the waste mass to the well, the biogas collected from the well is consistent in its composition.

The method can be further improved by monitoring the gas composition of the gas-permeable conductive layer and adjusting the rate of biogas withdrawal from the well in response to the gas composition of the gas-permeable layer. Withdrawal of biogas from the well creates a partial vacuum that draws gas from the gas-permeable conductive layer down through the waste mass to the well. If the rate of gas withdrawal from the well is too rapid, air will be entrained from the atmosphere into the gas-permeable conductive layer. But if the rate of gas withdrawal from the well is too slow, biogas may percolate through the gas-containment layer and the surface of the landfill to escape. Monitoring the gas composition of the gas-permeable layer allows one to determine quickly and continuously whether the rate of gas withdrawal from the well is too fast or too slow and adjust the rate accordingly. If the gas-permeable layer has too much nitrogen or oxygen, too much air is being entrained into the gas-permeable layer, and the rate of biogas withdrawal from the well is too fast. But if the gas-permeable layer contains no nitrogen or oxygen, the rate of biogas withdrawal from the well may be too slow, and biogas may be escaping from the surface of the landfill.

One embodiment of the invention provides a method of collecting biogas from a landfill wherein the landfill has a surface contacting the atmosphere that involves: (a) providing the landfill at or near the surface contacting the atmosphere with a gas-containment layer that has low gas permeability; (b) providing the landfill with a gas-permeable layer toward the interior of the landfill from the gas-containment layer and toward the exterior of most of the landfill waste mass, the gas-permeable layer having at least 10-fold the gas-permeability of the gas-containment layer; (c) providing the landfill with at least one gas-collection well that collects biogas from an extraction location toward the interior of the landfill from the gas-permeable layer and separated by waste from the gas-permeable layer and draws it to the surface, the well comprising a biogas-collecting wellhead at the extraction location and a gas-impermeable conduit linking the wellhead to the surface to draw biogas from the wellhead to the surface; and (d) collecting biogas from the landfill toward the interior of the landfill from the gas-permeable layer through the at least one gas-collection well. In the method little if any biogas is collected directly from the gas-permeable layer—less than 10% of the volume of biogas collected from the landfill beneath the gas-permeable layer through the at least one gas-collection well.

One embodiment of the invention provides a method of collecting biogas from a landfill having an upper surface contacting the atmosphere, wherein the landfill contains (i) at or near the outer surface contacting the atmosphere a gas-containment layer that has low gas permeability; and (ii) a gas-permeable layer toward the interior of the landfill from the gas-containment layer and toward the exterior of most of the landfill waste mass, the gas-permeable layer having at least 10-fold the gas-permeability of the gas-containment layer. The method involves collecting biogas from the landfill from a location toward the interior of the landfill from the gas-permeable layer with at least one gas-collection well that collects biogas from an extraction location toward the interior of the landfill from the gas-permeable layer and separated by waste from the gas-permeable layer and draws it to the surface, the well comprising a biogas-collecting wellhead at the extraction location and a gas-impermeable conduit linking the wellhead to the surface to draw biogas from the wellhead to the surface. Little if any biogas is collected directly from the gas-permeable layer—less than 10% of the volume of biogas collected from the landfill beneath the gas-permeable layer through the at least one gas-collection well.

Another embodiment of the invention provides a method of adapting a landfill for biogas collection, wherein the landfill has a surface contacting the atmosphere. The method involves first providing the landfill with a biogas-collection system comprising: (i) at or near the surface contacting the atmosphere a gas-containment layer that has low gas permeability; (ii) underneath the gas-containment layer and above most of the landfill mass a gas-permeable layer that has at least 10-fold the gas permeability of the gas-containment layer; and (iii) at least one gas-collection well that collects biogas from an extraction location beneath and separated by waste from the gas-permeable layer and draws it to the surface, the well comprising a biogas-collecting wellhead at the extraction location and a gas-impermeable conduit linking the wellhead to the surface to draw biogas from the wellhead to the surface. In operation of the system biogas collection through the gas-collection well generates an entrainment zone of the landfill beneath the gas-permeable layer, the entrainment zone defined as a 2-dimensional area immediately underneath the gas-permeable layer through which at least 30% of gas passing from the gas-permeable layer to the gas-collection well passes. The method involves second providing the landfill with a gas-impermeable geomembrane in or above the gas-containment layer and vertically overlaying most or all of the entrainment zone to prevent gas flow from the atmosphere above the entrainment zone.

DETAILED DESCRIPTION OF THE INVENTION

Analysis of Problems with Existing Landfill Biogas Collection Methods.

Figure 1:
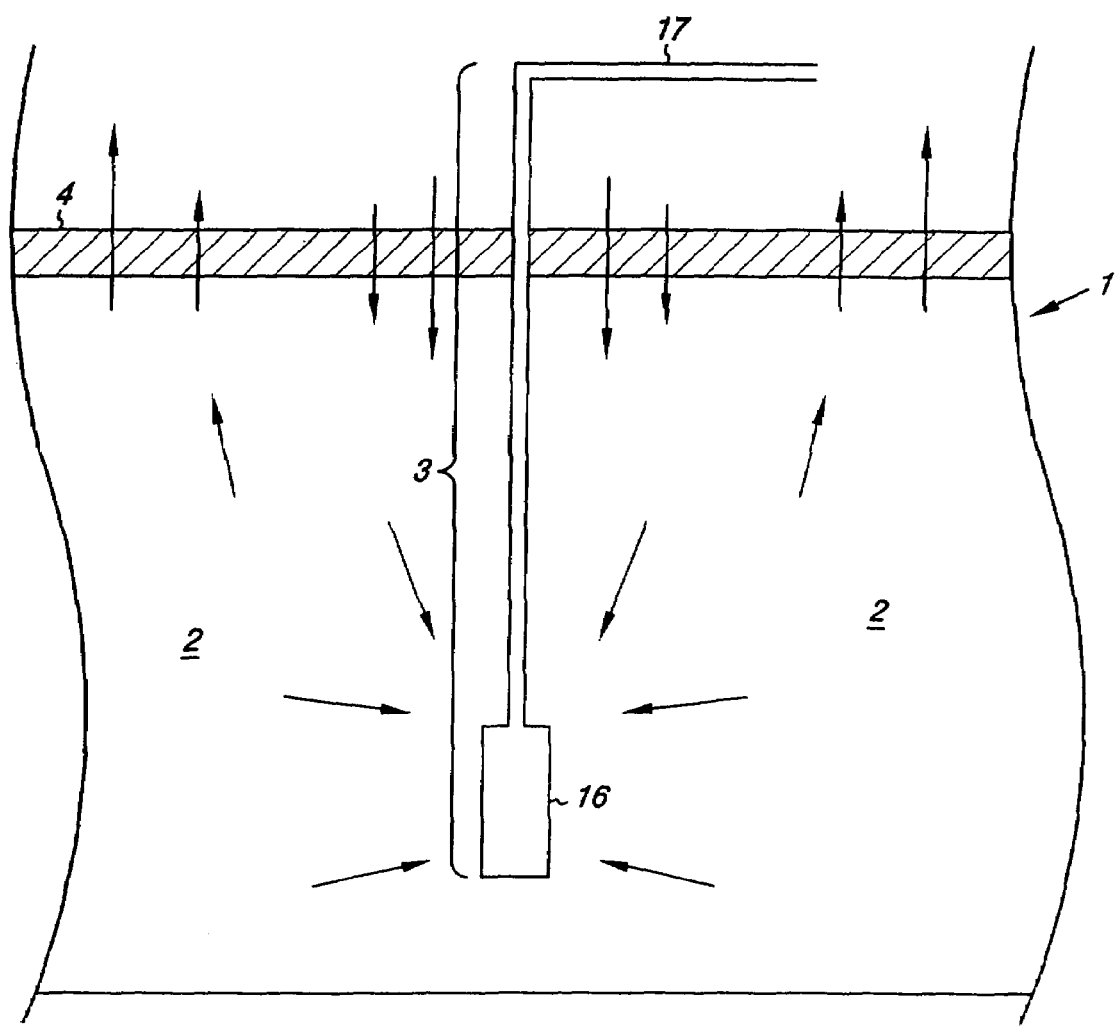
FIG. 1 shows a prior art landfill biogas collection system.
Figure 2:
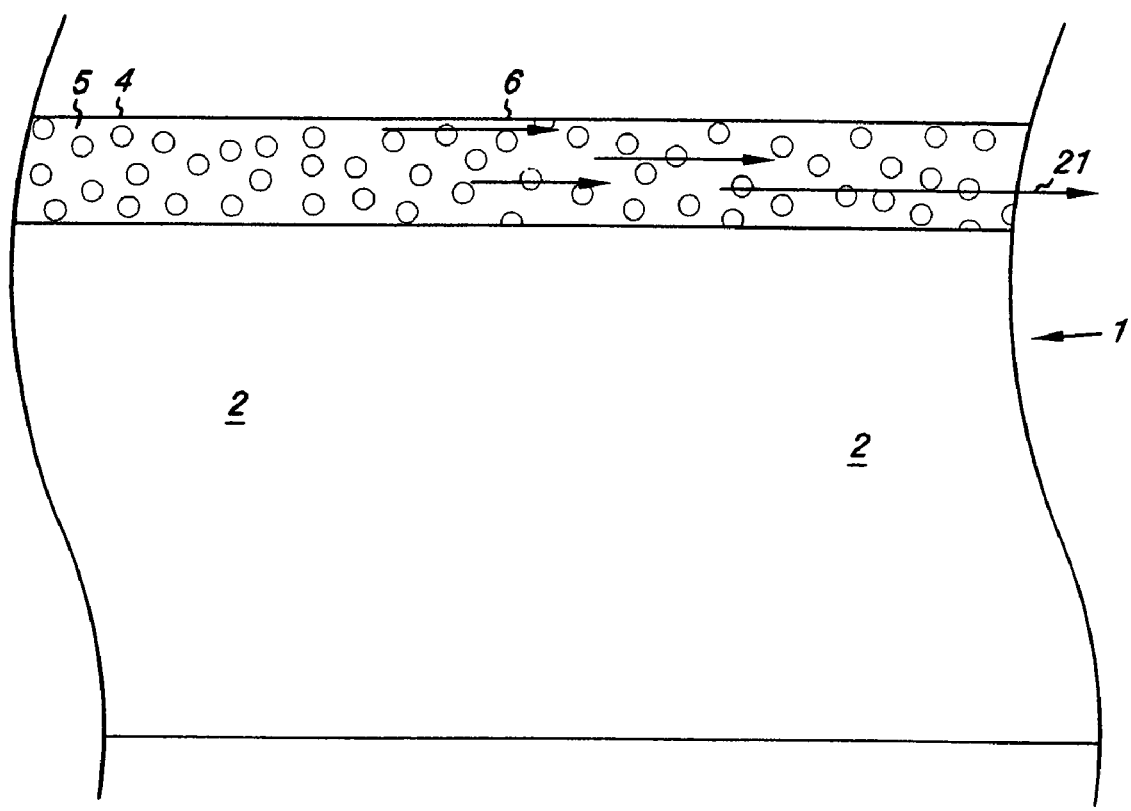
FIG. 2 shows another prior art landfill biogas collection system.

U.S. Pat. No. 4,442,901 by Zison, contemplates gas recovery from the highly conductive layer itself. However withdrawal of gas from the highly conductive layer 5, as in FIG. 2, has an associated problem that is subtle but major. U.S. Pat. No. 4,442,901 did not consider barometric effects. Barometric effects can cause pronounced short-term variation in outward surface fluxes of LFG into the conductive layer, or, conversely, downward fluxes of gas that may be entrained into the conductive layer as shown in FIG. 1. As a practical matter, there is always pressure communication and equilibration of absolute pressure within the highly conductive layer with the ambient atmospheric pressure. With typical gas-filled void totals in landfilled waste, gas expands and contracts with barometric fluctuations. This volumetric rate of expansion or contraction is in fact very substantial relative to the volumetric rate of LFG generation itself. This LFG expansion or contraction can in turn cause LFG flux into the highly conductive layer to easily vary over short terms from (as an example) zero to approximately twice the mean. In turn, LFG from the highly conductive layer will vary in energy content and/or allowable extraction rate. This presents difficult, if not impossible, problems, including operation of energy equipment on gas whose flow and/or methane content can vary rapidly due to such barometric effects.

An example, with detailed analysis, to illustrate the types of flux variation that may occur due to barometric fluctuations is presented in Comparative Example 1. Such flux variations are clearly great enough to pose serious control problems.

With the present invention, these problems and difficulties with previous approaches are addressed and circumvented.

DESCRIPTION OF PRESENT INVENTION

Figure 3:
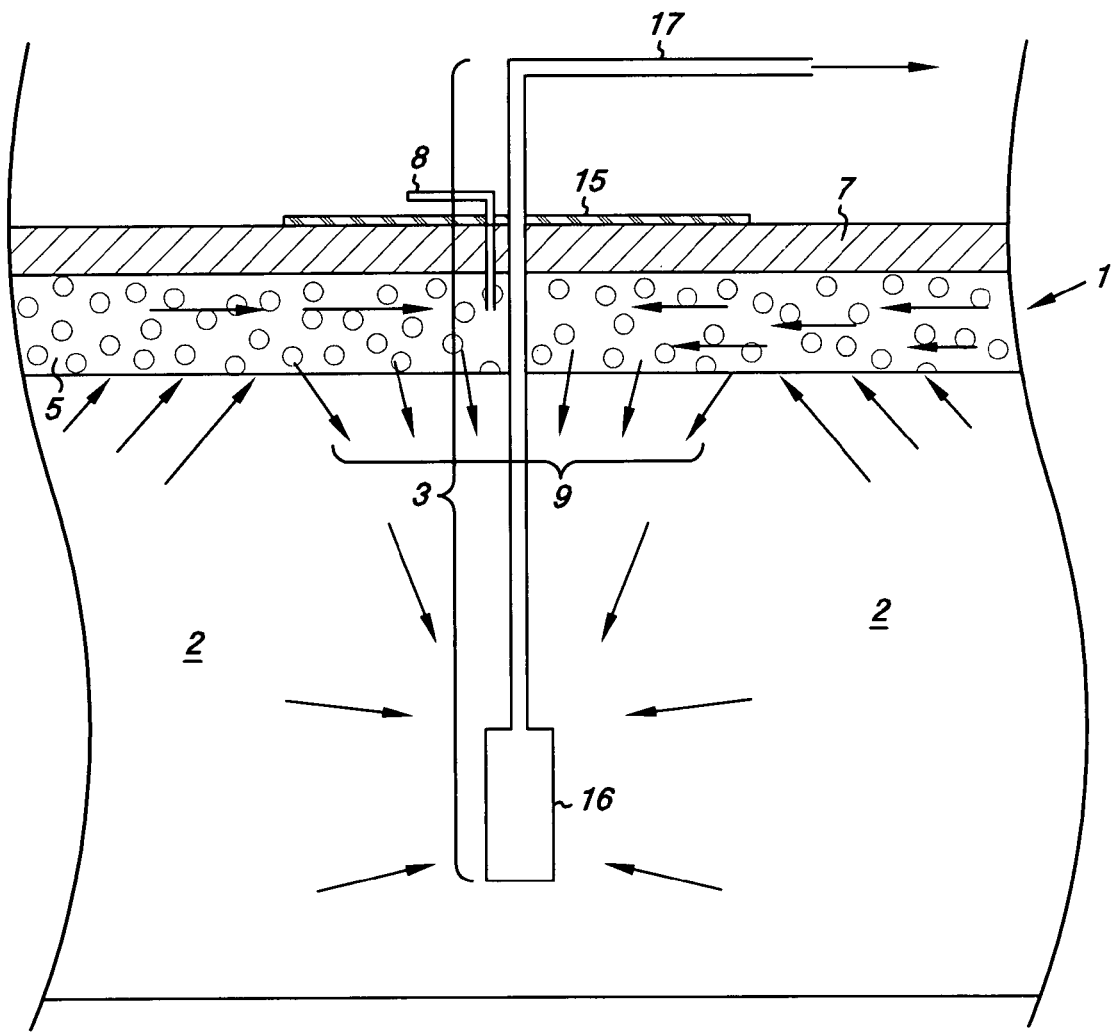
FIG. 3 is a schematic showing a landfill biogas-collection system and method of the invention. In this case the outer surface of the landfill faces up and permeable layer is horizontal, as would often be the case.

Combining Permeable Layer with Deep Extraction, and Low-Permeability External Containment The invention generally involves combining a low permeability gas-containment layer near the surface or other outer boundary of the waste, with a highly gas conductive layer underneath or more toward the interior of the waste relative to the gas-containment layer, and with extraction by the deep well(s) underneath, or toward the waste interior from, the gas-conductive layer. A schematic is shown in FIG. 3. Landfill 1 containing waste 2 generates biogas (biogas flows shown by the arrows). Biogas is collected and extracted through well 3. The well 3 includes a gas-collecting wellhead 16 and a gas-impermeable conduit 17 linking the wellhead to the surface to draw biogas from the wellhead to the surface. Overlaying the majority of the waste 2 is a gas-permeable layer 5. The term "wellhead" refers to a section of the gas-extraction well where gas can enter the well, e.g. a section of pipe having slots or other gas-flow apertures cut in it. In the landfill gas industry, the wellhead is sometimes called a "slotline." Often, the wellhead is also surrounded with gravel.

The gas-permeable layer is typically composed of a conductive porous matrix with gas flow paths. Often it is composed of rigid or semi-rigid particles of a large enough size to leave a significant void volume between particles. For instance, the gas-permeable layer may contain gravel, wood chips, or shredded tires. Above the gas-permeable layer is a gas-containment layer 7. Biogas that rises from the landfill reaches the gas-permeable layer where it is trapped by the overlying gas-containment layer 7. The biogas migrates horizontally in the gas-permeable layer until it comes close to a well. Gas extraction from the well creates a vacuum that draws gas into the well. This vacuum draws biogas from the overlying gas-permeable layer down through the waste mass of the landfill to reach the well. The area immediately beneath the gas-permeable high conductivity layer 5 through which a substantial fraction (at least 30%) of the biogas from the gas-permeable layer passes as it travels to the gas-collection wellhead is the entrainment zone 9. On its passage through the waste 2, the gas from the gas-permeable layer mixes with biogas produced in the waste mass that has not gone through the gas-permeable layer. This helps to give a consistent content to the biogas that is withdrawn from the well. If gas is withdrawn directly from the gas-permeable conductive layer, the gas composition will vary more dramatically over time, sometimes containing a high air content and sometimes not.

Preferably the landfill also contains a sensor 8 to sample and sense gas composition in the gas-permeable layer. Air inevitably permeates most landfill containment, and air intrusion can almost always occur and has potential to be a problem. If the gas-extraction rate from the well 3 is too high, air intrusion gases, e.g., nitrogen, oxygen, or argon, will be detected at high levels in the gas-permeable layer, as they are pulled into the gas permeable layer from the atmosphere by suction created by the gas-collection from the well. (Nitrogen is the preferred gas to monitor for detection of air contamination of the landfill gas of the gas-permeable layer.) If the gas-extraction rate from the well 3 is too low, biogas will tend to escape from the landfill by rising at points distant from the wells. If no air gases are detected in the gas-permeable layer, the gas extraction rate from the well 3 may be too low.

The permeability of the gas-permeable layer and the gas-containment layer can be assessed using measurements on typical material samples and applying the generalized Darcy equation:

$$\Delta P / \Delta L = D \mu V s$$

Where
 $\Delta P$=pressure drop, appropriate units
 $\Delta L$=distance gas flows,
 D=permeability proportionality constant (often expressed in Darcys)
 $\mu$=viscosity
 Vs=superficial gas velocity in cm/sec.

or $$D = \frac{13157 (Vs) * \Delta L}{\Delta P}$$

where
 D=permeability in Darcys.
 $\Delta P$=pressure drop in dynes/cm$^2$.
 Vs=superficial gas velocity in cm/sec.
 $\Delta L$=distance gas flows, in cm.

The measurements of materials' permeabilities may be made in laboratory settings, by correlating controlled gas fluxes with measured pressure drops in the laboratory setting. Or the permeability may be taken from literature and other compilations of typical solid waste and permeable layer properties. A typical example of such a compilation, satisfactory for ash and landfilled waste is contained in the PowerPoint presentation of Professor Toshihiko Matsuto, 2004 "Air Permeability, Diffusion Coefficient and Tortuosity of Incineration Ash" from the Third Intercontinental Landfill Symposium (Sapporo, Japan, December). Permeabilities are usually expressed in terms of typical upper and lower limits.

Permeabilities are often expressed in Darcys. A Darcy is that amount of permeability allowing a flow of 1 cm/sec superficial velocity fluid having viscosity of 1 cp through a pressure gradient of 1 atmosphere per cm. The viscosity of LFG can be taken, to a close approximation, as $1.3 \times 10^{-4}$ poise, or about 1/70th that of water.

Also, if the layers can be approximated as composed of rigid spherical particles, gas permeability can be calculated. Gas permeability is proportional to the square of the pore size between particles. Also, the flow properties of layers of a porous matrix can normally be approximated as composed of rigid spherical particles or "equivalent spheres."

The permeabilities may also be computed using correlation such as the Ergun equation: (cited from McCabe and Smith, Unit Operations of Chemical Engineering, McGraw Hill, 1993). The equation is $$\Delta P/\Delta L = 150 V_s \mu (1-\epsilon)^2 / \Phi^2 Dp2\epsilon^3 + 1.75 \rho V_s^2 (1-\epsilon) / \Phi Dp\epsilon^3$$

Where $\Delta P/\Delta L$=Pressure gradient in dynes/cm$^2$ per cm path length.

Vs=superficial LFG flow velocity based on empty cross section, cm/sec $\mu$=viscosity (LFG=$1.3 \times 10^{-4}$ Poise).

$\epsilon$=void fraction in porous layer, estimated from bulk density.

$\Phi$=shape factor, (1 for spheres).

Dp=particle diameter (an "equivalent sphere" can be defined for a porous matrix).

$\rho$=liquid density.

Improvements and benefits associated with present invention. This arrangement improves and optimizes extraction by several effects:

1. Improved gas quality. The extraction from the large deep void LFG volume in the landfill, in combination with re-entrainment of LFG emitted far from the wellhead, gives mixing of LFG on its way to the deep wellhead, and relatively constant gas composition and high quality from the large deep reservoir comprised of the voluminous total of deep voids. The composition of this deep void gas will be constant or very slowly changing. The constancy of composition is due in part to 2 factors: (a) The mixing in passage through the waste. Even if composition of gas entering the entrainment area may vary somewhat over hours or days, the multiple flow paths and associated dispersive and diffusional mixing as the gas moves toward the deep extraction zone will "time average" the concentration and minimize variations. (b) Given the long transit time of gas from the surface entrainment area to the deep extraction zone, diffusion will tend to further even out the composition variations. The constant composition of gas ideally means the gas from deep well extraction is suitable for all of the common LFG energy uses.

2. Improved fractional capture. The surface low-permeability barrier layer or geomembrane in combination with the highly conductive layer improves capture. The high conductivity layer allows preferential flow of any LFG emitted into the conductive layer to re-entrainment and recapture by the entrainment zone over the deep extraction well(s). Capture can thereby be increased to over 90% of generated gas with proper adjustment, (adjustment discussed below). The cover layer restricts both escape of LFG to the atmosphere, and minimizes infiltration of atmospheric air. It is important to note that infiltration of air otherwise occurring with conventional LFG extraction by wells, as shown in sketch 1a, is deleterious, interfering with LFG recovery by inhibiting LFG generation and also diluting recovered LFG.

3. Benefit to speed of monitoring and adjustment. A benefit to the near-surface highly conductive layer is the greater rapidity and precision with which adjustments can be made. Next is presented a brief discussion of conventional extraction adjustment, followed by a discussion of the invention's advantages in this regard.

Comparison to conventional deep well extraction adjustment A gas extraction system based on wells as in FIG. 1 cannot be simply installed and turned on. It must be adjusted ("tuned") to maximize recovery. Typical tuning gradually increases extraction rates from wells over time, until falling extracted methane levels collected from the well indicate that air entrainment through the landfill surface, and into the collected gas, is too high. If methane content falls too far, the well must be throttled down. Because of the very large volume of void gas relative to extraction rates, and imprecision and lags of feedback, the time constant for adjustments is long and the total time for adjustments can be several months. Furthermore, adjusting wells for changing generation or other factors is an ongoing and tedious process and feedback is also slow for such adjustment.

Extraction rate adjustments and avoiding overpull or underpull with the invention. With the present invention, too rapid extraction or "overpull" or insufficient rates of extraction, "underpull" are rapidly determined compared to conventional well extraction. This is because with "overpull", entrained air reaches the highly conductive layer in a small fraction (down to a few percent) of the time that is required for air to reach the extraction zones of deep wells (the wellhead). Gas can be sampled from one or multiple points within the highly conductive layer near the zone of entrainment over the extraction well as indicated in FIG. 3. Gas composition near the entrainment zone will indicate air infiltration anywhere served by the highly conductive layer. Furthermore, with some additional calibration effort (detail omitted here) the composition can provide the very useful ratio of air entrained to gas generated. And extraction rate can be "tuned" quickly and precisely to match generation, from observing falling highly conductive layer methane or increasing nitrogen content. Deep well extraction rate is simply increased until nitrogen begins to appear in the sampled gas from the highly conductive layer sample zone shown in FIG. 3. When slight amounts of nitrogen appear, nearly all LFG is being extracted. The situation is complicated somewhat by the mentioned barometric effects, but extraction efficiency would be over 95%. In practice, if highest efficiency capture and emissions abatement are required, there should be slight "overpull" that would assure gas capture in the presence of flux changes due to the mentioned barometric variations As the operation is described above, it is possible that LFG concentration will vary by location (location coordinates whether in xy or radial system) on its way to the entrainment zone abutting the conductive layer. For example more LFG dilution by entrained air will be seen in LFG in the flow near and from areas where air entrainment through the cover is occurring. It will be desirable in many cases, particularly for accurate material balances and quantifications of air entrainment, to have accurate but "averaged out" composition of that gas collected in the conductive layer that is then entrained into the surface over the deep well. For this purpose it may be desirable to constrain some defined portion of gas entraining over the deep well to "average out composition" by mixing before entrainment. Entraining gas can be constrained to flow through a narrow aperture in a cover over the entrainment zone, and thereby mix and give such an average composition that can be sampled. Values for (a) air/nitrogen content in the entraining LFG and (b) Air/nitrogen content in the gas collected from the deep wellhead can provide the basis for a complete material balance from which both fractional recovery and fractional air entrainment can be accurately estimated.

Figure 4A:
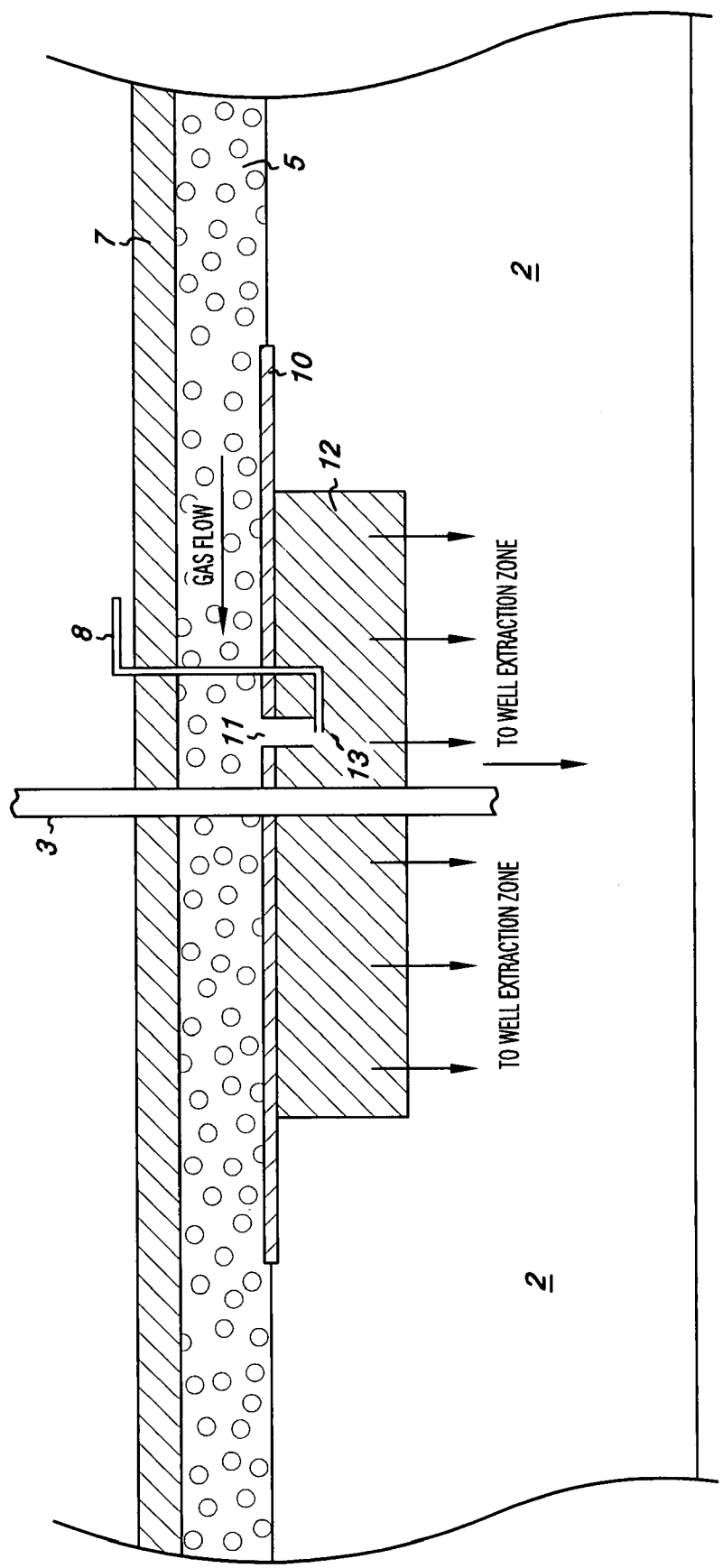
FIG. 4A is a side view of an embodiment of a landfill biogas collection system of the invention having a membrane with an aperture under the gas-permeable layer to facilitate accurate monitoring of the gas composition of the gas-permeable layer.
Figure 4B:
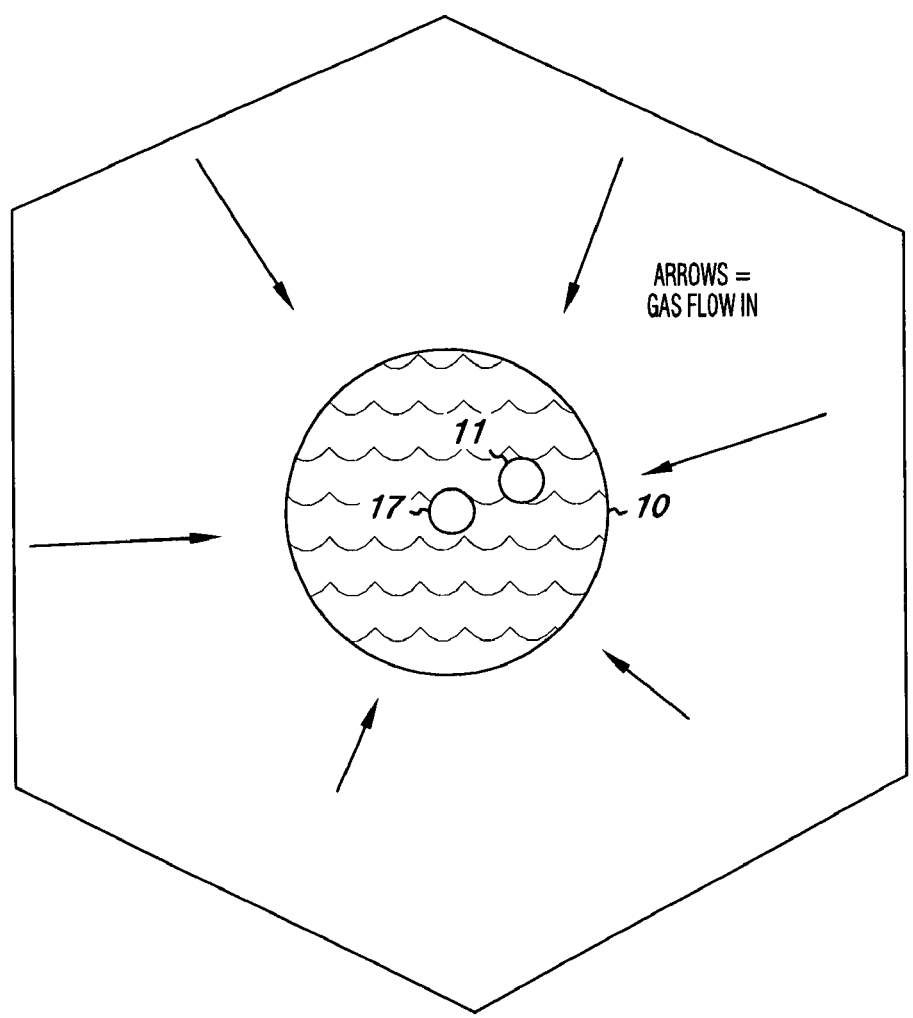
FIG. 4B is a top view of the membrane of FIG. 4A.

FIGS. 4A and 4B detail one arrangement where the composition of gas reaching and entraining into a circular zone over the deep well is collected and mixed at one point where its averaged composition can be assessed. The near-well entrainment zone 9 is covered by a relatively gas-impermeable membrane 10. The membrane has an aperture 11. If the membrane 10 covers most or all of the entrainment zone, most of the gas drawn from the gas-permeable layer 5 toward the well must pass through the aperture 11 in the membrane 10. Preferably the membrane 10 lies over a conductive sublayer 12, of radius less than the membrane, so that substantially all gas entering the entrainment zone from the submembrane conductive layer is mixed at aperture 11 before entraining. This mixing averages out local variations in the composition of gas in the gas-permeable layer, so sample point 13 near or in aperture 11 is an ideal point to sample the composition of gas in the gas-permeable layer. From compositions of entraining gas and collected exit gas from the well, material balances and flows can thereby be accurately determined by techniques well known to those skilled in the art of gas extraction from landfills. These techniques are discussed next.

FIG. 4B shows another view of membrane 10, showing the aperture 11 in the membrane and the point through which the conduit 17 of the gas-collection well passes.

4. Near-well composition as an indicator of acceptable entrainment. In many circumstances, and particularly at longer terms, providing atmospheric air entrainment is only through the upper landfill surface or a single waste face, it will be possible to establish the ratio of LFG collected via direct transmission through the waste mass to the well (without that LFG passing through the conductive layer) and that entering the entrainment zone via the conductive layer. Once the reasonable steady state is reached, the ratio of total gas extraction (measured flow of the exit stream) to the transmission within the conductive layer is very closely equal to the nitrogen content of gas sampled at the midpoint of the entrainment zone most proximate to deep extraction divided by the nitrogen content in the extracted stream. (This can be shown by flow modeling, detail omitted) The LFG extraction rate is also known. As a time average, all excess of extraction flow over generation will be reflected in air entrainment and close-to-linear increase in nitrogen content measured at given points in the extraction area. Given a desired or target nitrogen content in the exit gas (say 1-10%), simple calculations based on exit flow, and the conductive layer flow to the total flow will give the desired extraction rate to meet the desired or target nitrogen content.

Figure 5:
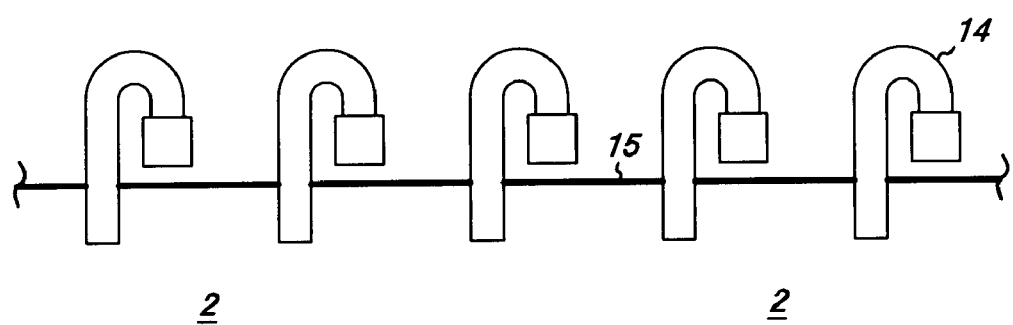
FIG. 5 shows a landfill having a waterproof membrane and vents on its surface to prevent liquid infiltration while allowing gas exchange.

5. Limiting transmissivity of the surface with a suitable membrane. There may be reasons for coverage of a landfill surface with membrane to augment the resistance of the barrier layer and performance of gas capture by the conductive layer as described above. One such reason may be to limit the infiltration of rainwater, particularly after closure, so that leachate generation and other postclosure and liquid-related aftercare problems are diminished. A second reason is to lessen transmissivity of the surface layers that serve to confine gas and prevent its emission. At the same time that a membrane is desirable, it is also desirable that the membrane be able to "breathe" as barometric fluctuations result in expansion and contraction of the void gas in the landfill. If the transmissivity is suitably decreased, the pressure drops due to surface gas exchange with the atmosphere become larger. The larger, more easily and precisely measurable, pressure differential between the conductive layer and atmosphere can serve as another indicator of air entrainment, fugitive losses and collection efficiency. Appropriate membrane designs are possible that substantially preclude liquid infiltration while allowing gas exchange. One such design is shown in FIG. 5, which is a gas impermeable membrane foundation, with gas ports allowing landfill-atmosphere gas exchange. FIG. 5 shows landfill 1 containing waste 2. An overlying geomembrane 15 that serves as a gas-containment layer is shown. Vents 14 allow some gas exchange, while the gas-impermeable geomembrane 15 prevents liquid infiltration into the sublayers. Liquid that falls on the geomembrane surface drains off on the surface of the geomembrane to the edges of the geomembrane.

By modeling, it can be determined that the risk of undesirable air entrainment through the low permeability cover, if there is any cover permeability at all, will be greatest directly over the location of maximum entrainment. It may therefore be desirable to place an even more impermeable layer such as geomembrane 15 directly over the zone of entrainment of gas from the permeable layer, that is created by the deep well. This is shown in FIG. 3.

Some key parameters of the present invention: It is expected that the highly conductive layer will be near the landfill exterior surface (within 12 feet of it although there may be some overlying waste serving as part of the "containment" or "barrier" layer). The fractional coverage of the landfill must be substantial to intercept any desired high fraction of emissions and/or preclude air entrainment. The fractional coverage is easily and most desirably total. The ratios of the highly conductive layer permeability to permeability of the low permeability cover serving for gas containment must be such as to allow gas exiting farthest from the deep well, where collection is least efficient, to be transmitted with high efficiency to the entrainment area over the deep well where it is re-entrained.

Dealing with Problems: Addressing Surface Breaches or Channeling

Based on experience, it is likely with the proposed landfill cover layers may develop breaches, or areas of high gas (either LFG or air) transmissivity. We propose that such "leaky" areas can be addressed by the following steps (a) Reduce extraction to a value less than generation.

(b) With a means to detect surface emissions, track down those areas of LFG emissivity. The means could include infrared optical density (FTIR) or combustible gas detector, i.e. FID, or other workable means known to those skilled in assessing gas emissions from landfills.

(c) Seal the cover breach with soil, membrane or other means.

The surface breaches do not become critical until transmissivity and resultant gas flow through transmissive areas or breaches become problematic, because of transmissivity in the presence of extant pressure gradients. Problematic situations could then arise as the result of (a) excessive air entrainment in the course of extraction, thus inhibition of methane generation and/or too much dilution, or (b) low fractional extraction. The system must in any case function to allow re-entrainment of LFG entering the highly conductive layer and the LFG conducted and re-entrained into the waste as shown in FIG. 3.

Summary of Example Numerical Analysis of Performance

A finite-element analysis of a "typical example" highly conductive layer LFG extraction system using parameters likely for application to a "typical" landfill configuration, cover layer, and permeabilities is given in Example 2. The parameters chosen are conservative and considered easily achievable for landfill gas recovery. The particular numerical analysis example of appendix B-1 shows that LFG capture is 95-99%, with proper control. The example calculation shows the calculated air infiltration at under 5%, i.e. that attainable LFG quality is extremely high. For the situation analyzed, monitoring to assure proper performance is straightforward. It is recognized that difficulties such as areas of high cover transmissivity or leaks might be encountered. However means are available to address these straightforwardly. Such means are discussed in Example 2.

Economics

Comment can be offered here on the likely economics as of permeable layer use as of the time of filing.

Use of permeable layers may reasonably be expected to result in an increase of 10-30% in recovered gas (see the numerical analysis in Appendix 1. For more background, the commonly used EPA default recovery of 75% could be raised to 98+% as exemplified by the numerical analysis of Example 2. An increased recovery is assumed here. A blower outlet gas value of about half of current natural gas energy prices, or $3/mmBtu can also be assumed. Further assumptions are that (a) the landfilled waste averages 100 feet deep at 50 lb/ft$^2$, for a total of 2.5 US tons/ft$^2$ landfill footprint, and (b) the collective gas generation over time is 2500 ft$^3$ CH$_4$/ton. The extra energy over time at 20% more recovery of generated gas would be 1250 ft$^3$, with value over time of $3.75 at the assumed revenue earned by the gas. The current value of the extra energy (however used) must by normal business standards equal the worth of placing the permeable layer at final capping. Such permeable layer placement has been estimated at $1.00/ft$^2$, so application of the invention to a larger landfill would seem well within the realm of economic practicality.

Specific Embodiments of the Invention

In one embodiment of the invention, the outer surface contacting the atmosphere is an upper surface of the landfill, the gas-permeable layer is underneath the gas-containment layer and above most of the landfill waste mass; and the biogas extraction location is underneath and separated by waste from the gas-permeable layer.

In one embodiment of the methods of the invention, if any biogas is collected directly from the gas-permeable layer, it is less than 2% of the volume of biogas collected from the landfill from the extraction location located toward the interior of the landfill from the gas-permeable layer through the at least one gas-collection well.

In another embodiment, the method includes monitoring composition of gas of the gas-permeable layer.

After monitoring the composition of the gas of the gas-permeable layer, the method can include adjusting the rate of biogas collection from the landfill from the extraction location located toward the interior of the landfill from the gas-permeable layer through the at least one gas-collection well based on the composition of gas in the gas permeable layer. In general, the rate of the rate of biogas collection is decreased if the gas in the gas permeable layer contains more air gases than desired or less methane than desired. If the gas in the gas permeable layer contains no air, the rate of biogas collection may be increased. If the rate of collection of biogas is too low, biogas may escape from the surface of the landfill by rising through the landfill. But if the rate of collection of biogas is too high, air may be entrained into the landfill to fill the low pressure zone around the biogas wellhead created by too rapid withdrawal of biogas. The air then contaminates the biogas, decreasing its quality, and contributes to an oxygenating environment in at least some zones of the landfill, which can lead to oxidation of methane and a reduction in microbial anaerobic fermentation that produces biogas. A reasonable target is 1-10% N$_2$ content of the gas in the gas-permeable layer, or a content of other air gases that would indicate equivalent air content in the gas-permeable layer.

In particular embodiments, the composition of the gas in the gas-permeable layer is monitored by gas chromatography, gas conductivity, or infrared spectroscopy.

Preferably, the gas in the gas-permeable layer is sampled for monitoring at a point within a 50-foot radius, parallel to the orientation of the gas-permeable layer (i.e., a 50-foot horizontal radius if the gas-permeable layer is horizontally oriented), of the wellhead of the gas-collection well, more preferably within a 30-foot radius.

Biogas collection through the gas-collection well generates an entrainment zone of the landfill beneath the gas-permeable layer (where the outer surface of the landfill contacting the atmosphere is the upper surface), the entrainment zone defined as a 2-dimensional area immediately underneath the gas-permeable layer through which at least 30% of gas passing from the gas-permeable layer to the gas-collection wellhead passes. In some embodiments, the landfill comprises a gas-impermeable membrane underneath the gas-permeable layer and overlying the entrainment zone, the gas-impermeable membrane defining an aperture through the membrane through which gas from the gas-permeable layer passes to the gas-collection wellhead; wherein the step of monitoring composition of gas in the gas-permeable layer comprises monitoring gas at or near the aperture through the gas-impermeable membrane.

The gas-permeable layer and the gas-containment layer should cover most or all of the of the landfill surface area, particularly in the zone of the landfill where biogas is being collected. In some embodiments, the area of the gas-containment layer and the area of the gas-permeable layer are each at least 50%, at least 80%, or at least 90% of the landfill outer surface area contacting the atmosphere.

The gas-permeable layer has at least 10-fold, preferably at least 100-fold, more preferably at least 1000-fold, and more preferably still at least 10,000-fold the gas permeability of the gas-containment layer.

The greatest pressure differentials arise in the entrainment zone, so the greatest risk of air drawdown into the landfill arises at the landfill surface above the entrainment zone.

Thus, to prevent this, in a particular embodiment, the gas-containment layer in areas over the entrainment zone has at least 30% lower average gas permeability than the gas-containment layer in areas not over the entrainment zone. In another embodiment, the landfill comprises at or near (e.g., within 1 meter) the surface of the landfill a gas-impermeable layer comprising continuous wood or clay over most or all of the entrainment zone to prevent air flow into the landfill from the atmosphere above the entrainment zone. In another embodiment, the landfill comprises a gas-impermeable geomembrane in or above the gas-containment layer and vertically overlaying most or all of the entrainment zone to prevent gas flow from the atmosphere above the entrainment zone. In particular embodiments, the gas-containment layer area over the entrainment zone has an average thickness at least 30% greater than the gas-containment layer area not over the entrainment zone.

In particular embodiments, the gas-containment layer is predominantly soil.

In particular embodiments, the gas-containment layer is predominantly clay.

In particular embodiments, the gas-containment layer comprises a synthetic membrane.

In particular embodiments, the gas containment layer is located at the base or side layers of the landfill, where those layer contact the atmosphere, either directly or indirectly by means of an available flow path to the atmosphere (such as a base leachate collection system that conducts gas to the atmosphere), with the proviso that the permeable layers are present in the direction of the waste interior to the containment layer.

The gas-permeable layer is generally permeable because it has relatively large pores between particles in the layer, or large interconnected pores within the layer. For instance, clay is a good material for the gas-containment layer because it has very small particles and small to non-existent pores between particles. In contrast, gravel and shredded tire are good materials for the gas-permeable layer because they have large rigid or semi-rigid particles that generate considerable gas voids between particles.

Thus, in particular embodiments, the gas-permeable layer comprises predominantly rigid or semi-rigid particles with an average particle diameter of 1 mm or greater, wherein gas-flow passages exist between the particles. The particles may be, for instance, gravel, pebbles, shredded tire, pieces of construction debris, paving debris, concrete chunks, wood debris, wood pallets, wood branches, wood logs, wood twigs, or wood chips.

In a particular embodiment, the gas-permeable layer comprises a network of apertured conduits oriented generally parallel to the surface contacting the atmosphere. The horizontal gas flow through the gas-permeable layer may be primarily through these conduits.

In a particular embodiment, the gas permeable layer comprises an apertured transmissive layer that is two parallel screens with space between screens to conduct gas.

In particular embodiments, the methods of the invention include adding moisture or nutrients or both to the landfill mass to promote biogas formation in the landfill.

In particular embodiments, the methods include heating a portion or the whole of the landfill mass to promote biogas formation in the landfill.

EXAMPLES

Comparative Example 1

This Example analyzes gas flow in a prior art landfill. The LFG generation from conventionally landfilled waste has been extensively investigated, and the typical bounds on generation-associated LFG flux from the surface of the waste are discussed below in Section 1. Aside from the flux that is directly due to LFG generation, additional surface gas fluxes resulting from barometric fluctuations are superimposed on the generation related flux. It is straightforward to calculate the barometric flux as shown in Section 2. From these example calculations, it is easily seen how the superimposed barometrically induced flux may for example result in total surface fluxes that vary as much as from zero to twice the time-average of the flux due to generation. In turn, it is easily seen how barometrically induced fluxes pose a serious interference to constant rate recovery of reasonably constant LFG composition from the highly conductive layer.

Section 1. LFG Generation By "Typical" Conventional Landfills

The rates of (and bounds on) LFG generation from conventional landfills are well established from prior studies, in particular Vogt and Augenstein (1997) who examined gas recovery from 19 landfills (in a US Department of Energy supported study for the Solid Waste Association of North America, SWANA). For present purposes the critical findings of this study were:

(a) That the normalized generation rates of LFG ranged downward from a median peak level of about 0.009 M3/(tonne–day) (tonne=metric ton) or about 4×10–4 M3 tonne per hour.

(b) That the generation/recovery was best described by an exponentially declining rate (the widely used "EPA generation model").

(c) With this observed generation profile, half of the ultimate gas yield will be generated at less than $2 \times 10^{-4}$ m$^3$/tonne hour as LFG generation characteristically declines.

With a density for placed waste of 700-850 kg/cubic meter (ca 1200-1450 lb/cubic yard) the range of methane generation rates per unit volume will range from $3.4 \times 10^{-4}$ (m$^3$ gas/m$^3$ waste-hr). Half or more of the aggregated long-term gas generation occurs below the median of 1.7×10–4 m$^3$ gas/m$^3$ waste-hr. This is used in the example calculation that follows, comparing surface gas flux due to generation with surface flux due to barometric effects.

As an example we choose a mass of waste that is generating methane at slightly above the median rate, at about 2×10–4 m$^3$gas/m$^3$waste-hr). A depth of waste 25 meters (84 feet) is chosen for illustration purposes. At this generation rate and waste depth, it is straightforward to calculate generation beneath a one square meter of footprint as $5 \times 10^{-3}$ m$^3$/hour. Without extraction, the surface flux due to generation alone—disregarding barometric effects—would thus be $5 \times 10^{-3}$ m/hr, or 0.5 cm/hour for this example. This generation, is in fact extracted at constant rate, with, as noted above, generally some slight excess extraction (overpull), resulting in air penetrating the landfill. As discussed above, with such constant extraction (and slight overpull) methane emissions measured by surface scans are normally well within regulatory bounds.

Section 2. Landfill Void Gas, and Barometrically Induced Flux

Solid waste, placed in and reposing in landfills, typically contains gas-filled voids, (as "flooding" or "soaking" leaving no interstitial air in pores in the waste, even with bioreactors, is not allowed). The volume of this void fraction is difficult to estimate, but indirect indicators exist. Indicators are the gas permeability of waste and the compressibility of waste to greater-than-landfill densities using high pressure compactors. Further, "as landfilled" waste can "imbibe" nominally about 25-35% of its weight in water (see for example Augenstein et al., 2003) without any increase in waste volume. This waste compressibility and ability to imbibe water would not be possible unless void space gas is a high fraction of the waste volume. We estimate that the void volume fraction is typically 25-30%, but can vary from perhaps 15% to 35%.

Changes in barometric pressure have been shown by several workers to rapidly transmit to this void gas in waste, so that equilibrium with ambient barometric pressure is reached with lag times of a few minutes to at most an hour throughout the waste (Lu and Kunz, 1981) and (Bentley et al., 2002). The effect of these pressure fluctuations, particularly on composition and exsolving $CO_2$, has been examined in a detailed mathematical analysis by Young (1991).

At an example void fraction of 25% and depth of 25 meters, the voids beneath the landfill surface amount to about 6 cubic meters of gas-filled void or pore space beneath each square meter. A change in barometric pressure readings can be about 0.1% per hour. Changes of 1% in absolute atmospheric pressure on a diurnal basis are routine. One example is as follows: Over California's large central valley in the summer, solar heating heats low level air and causes barometric pressure to first fall in the morning from about 30.15 in Hg to 29.85 inch Hg, with nightfall reversing this trend. The barometric pressure changes are about in the order of 0.08% per hour, over a 24-hour day. This barometric behavior is generally true for the entire US West Coast, around the Great Lakes, the Gulf Coast and the Eastern seaboard, and near up to half the US population and landfills.

Such barometric changes will superimpose additional gas flux due to expansion or contraction of the void gas. For the present example, 6 $m^3$ of void gas beneath the surface, flux from a 0.08%/hr change in barometric pressure will be about 0.5 cm per hour, assuming (as is the case) that pressure differentials equilibrate within less than an hour. The net result of barometric effects for our example is that during a rising barometer (at night) the average gas flux out of the landfill is reduced to near zero. During the day, with a falling barometer, the surface gas flux doubles from the daily average.

Example 2

Numerical Analysis of Gas Collection. A Calculation of Highly Conductive Layer Application and Performance for Gas Collection Effectiveness Definition of performance. Performance is defined here by two criteria: completeness of generated LFG collection, desirably over 90%, and limiting air entrainment, such that nitrogen from entrained atmospheric air is under 10% (and thus methane content over 50%, with LFG as generated at its "typical" 55% methane).

The following is an analysis of gas recovery using one example (of many possible) of the near-surface LFG-conducting (highly conductive) layer described in the preceding text. This example is chosen to be realistic and constructible. Parameters are chosen to be conservative. It is recognized that key parameters may actually range widely. Thus sensitivity of LFG recovery performance to changes in important parameters is discussed later.

Summary of LFG recovery performance. Finite element analysis indicates that there can be over 98% LFG recovery, with atmospheric air entrainment resulting in less than 4% $N_2$ content in the recovered gas. The ability to achieve this performance is considered very likely. Ways to overcome any potential barriers are discussed in the comments in Appendix B-2

Specifications of example gas recovery system. The example gas recovery situation assumes an example landfill section as shown in FIG. 3. The landfill section is circular and served by a single well. (The error introduced by this assumption is actually rather small, comments below) It consists, from the bottom up, of:

A. Normal base layers, with operating and base layers, and leachate recovery provision B. A deep layer of normally landfilled waste, 100 feet (30 meters) deep C. A normal gas well (could be multiple wells), designed according to industry standards. However the extraction zone, or slotlines" are about 40-60 feet below the surface, at depth that guarantees that a significant fraction, typically 10-30% of generated LFG is entrained from the conducting layer back down through the surface in the immediate vicinity of the wellbore.

D. A highly permeable (highly gas conducting) layer. The purpose of this layer is to act as an LFG collection layer for nearly all gas issuing from waste abutting the layer, and rerouting the LFG to re-entrainment above the deep well. The gas captured by this highly conductive layer includes that which would normally be emitted and lost to the atmosphere far from a conventional deep well.

E. Over the conducting layer are cover layers. The cover may consist of soil or waste and soil atop the waste. The cover layers are less highly conductive than the highly conductive layer, by a factor of 10 to $10^5$, with higher ratios more desirable. The cover layers act as a barrier for both gas emission and entrainment. Cover layers should be porous and have accessible voidage, so that the expected gas-air interface can move up and down within the cover layers, for example as needed to accommodate void gas expansion and contraction due to barometric effects.

If waste is used for cover layers, it should pose minimal incremental cost, consisting of material that must in any case occupy the landfill air space or comprise cover. As discussed elsewhere, the cover layer will allow fluctuations in the contained volume that may be due to either extraction rate variation or barometric effects Analyzing gas recovery performance. Exact analytical solutions for gas flow are extremely complex. The approach here is to use a kind of finite element analysis, which will give a solution with precision (discussed later) sufficient to evaluate performance. Parameters are chosen conservatively. Performance (defined above) is likely to exceed that calculated here, for reasons outlined below, including measures that may be taken that would mitigate problems and improve performance.

Where possible below, calculations below use the units of centimeters/grams/seconds. These "scientific" units are straightforward as any for a calculation of this type and minimize conversions. The common engineering units (feet, pounds, meters, CFM, etc.) are also given Approach: The overall extraction goal is to recover nearly all of the gas while still minimizing the atmospheric air infiltration rate. As seen below, this is possible. The configuration of the type shown in FIG. 3. The depth from the landfill surface to the base of the landfill is 100 feet. The wellhead 16 of gas-collection well 3 is 40 to 60 feet below the surface. On the surface is optionally a 1-foot thick soil/compost biofilter layer. Beneath this is the gas containment layer 7, which is about 6 feet thick and consists of waste and soil. Immediately beneath this is the gas-permeable conducting layer 5, which is 1.5 feet thick. A sensor monitors gas composition in the gas-permeable layer 5 at a point above the entrainment zone.

Method: The method is to increase extraction rate in increments and analyze for atmospheric nitrogen infiltration into the highly conductive layer around the conduit of the well. This infiltration indicates a small but desirable amount of air intrusion. The target nitrogen in LFG is most likely of the order of 1-4% depending on various factors. If there should be unintended "overpull", data on increasing nitrogen levels in the sampled gas with time can be used in material balances to define a target LFG extraction rate (detail omitted here).

Other assumptions: One simplifying assumption is that gas generated within the waste moves vertically into the highly conductive layer to collection by entrainment near the well. (This assumption is actually conservative from the standpoint of calculating pressure drops, recovery and air entrainment, inasmuch as much gas will also travel within the waste directly to the extraction zone of the well.) Assumptions critical to the analysis are shown in Table 1.

TABLE 1

ASSUMPTIONS USED IN ANALYSIS OF GAS RECOVERY EXAMPLE

1. Total depth of landfill = 100 feet (30 m)
2. Total depth of cover layers, extending from highly conductive layer to surface, = 2 m (6 feet).
3. Total thickness of gas conducting layer = 1.5 feet (46 cm)
4. Total density of waste = 1350 lb/cubic yard
5. (For reference later) The specific LFG generation rate, SLFG is $1.78 \times 10^{-7}$ cm$^3$/cm$^3$ landfill per second. Calculating from this and the selected depth, LFG enters gas conducting layer from the surrounding waste at the upper limit of at most a superficial velocity Vs of $5.328 \times 10^{-4}$ cm/sec based on empty cross section. This comes from assumptions including LFG methane yield = 1.8 ft$^3$ CH$_4$ or 3.3 ft$^3$ LFG year$^{-1}$, k = 0.05 year$^{-1}$, and an assumed waste density of 1350 lb/yd$^3$. All generated gas is assumed to move into the conducting layer (conservative because in reality, the fraction may be 25-75%).
See Note 1 for more supporting calculations and information. It should be noted at this point that, with the stated control, and other things being equal, the collection efficiency and air infiltration are independent of the rate at which gas enters the conducting layer.
6. Gas flow is equivalent to that flow resulting if all generated gas flows to entrainment area. An optional assumption is that the entrainment area is 10 meters in diameter.
7. LFG is collected from a circular control area with radius 50 meters (diameter 100 meters or 337 feet). This circle actually compares very closely to an actual hexagonal gas extraction footprint that would result from normal well spacing.
8. It is assumed that the cover layer may be permeable, of waste or material with the assumed permeability. Permeability of surface layers = 100 Darcys (This is conservative Lower values are disclosed in Emcon, Methane Generation and Recovery from Landfills, Ann Arbor Press, 1982)
9 The permeability of the high conductivity layer is 10$^6$ Darcys (see supporting calculations, Note 1 below)

After adjustment for conversion factors, the expression in cgs units for LFG pressure gradient for laminar flow of LFG through porous media is $$\Delta P / \Delta L = \frac{13157 (Vs)}{D} \quad \text{B-1-1}$$

or rearranged, $Vs = D[\Delta P/\Delta L]/13157$    B-1-2

Where
$\Delta P$=Pressure drop, dynes/cm$^2$
$\Delta L$=distance gas flows, cm
Vs=superficial gas velocity cm/sec.
D=permeability, Darcys LFG flows into the conducting layer at the upper limit of 5.328 cm3/cm2.footprint.sec. (See Table 1 assumption 4.) For finite element analysis, the assumed footprint for gas extraction can be subdivided into concentric rings. Within each ring, the gas entering the ring from abutting waste is at most $$QLFG=10,000\pi(R_2^2-R_1^2)\times 5.328\times 10^{-4}$$

Or $QLFG=16.74(R_2^2-R_1^2)$    B-1-3

Where QLFG is the flow of landfill gas, cm$^3$/sec (in this case within the ring)

$R_2$ is the outer radius of the ring in question $R_1$ is the inner circumference of the ring in question 10,000—converts square meters to square centimeters (m$^2$ to cm$^2$)

The gas generated within each ring can be calculated. From the total of generated within each ring, summed from the outside in, the total gas flow across any chosen radius toward the entrainment area can be calculated straightforwardly. The calculation of flow is made in Table 2 for the midpoint of selected radial increments, i.e. at radii equal to (R2+R1)/2. The conducting layer area for an assumed height of highly conductive layer of 0.5 Meters (50 cm=1 ft 8 inches) is given by $$Ap=2\pi Rh=3.14\times 10^4 \text{ cm}^2\times R \text{ in meters}=3.14\times 10^4 R \quad \text{B-1-4}$$

Where Ap=area of collection layer, cm$^2$.

R=chosen radius, meters.

From these the total gas flux across any radius R$^1$ is given by $$QLFG=16.74(Rm^2-Ri^2)/3.14\times 10^4 R \quad \text{B-1-5}$$

Combining B-1-1, B-1-4 and converting to cm for length units, the lateral and radially inward pressure gradient at any radius R reduces to $$\Delta P/\Delta R = \frac{13157[16.74(Rm^2-Ri^2)/3.14\times 10^4 R]}{D}$$

Where $\Delta P/\Delta L$ is dynes/cm$^2$-cm path length and other units are as defined above Omitting some rather voluminous numerical detail the finite element analysis does the following:

1. Splits the LFG control area into concentric circles at increments of 50, 45, 40, 35, 30, 25, 22, 20, 18, 16, 14, 12, 10, 8, 6, 5 Meters.
2. Determines gas generation within each increment of radial distance.
3. Calculates the gas flowing across the midpoint of each radial increment, and the flux at that point. These calculations are shown in Table 2. A boundary layer condition is then chosen (arbitrarily) that the pressure drop at the outer perimeter is zero, i.e., that the pressure gradient across the cover layers (whatever their makeup, and assuming conductivity is zero). With the flux as determined in Table 2 the finite element analysis then calculates first the pressure gradient across the element, then the total pressure drop across the element, and then the total pressure drop from the outer perimeter in to those selected radii.

These calculations of Table 2 give a first key element to the analysis, the pressure within the conducting layer. Some consideration must be given to air entraining through the cover and to gas generation in the cover layers (if waste), but these and any errors from them turn out to be small.

Note cover layer self generation and pressure and emission consequences. If the cover layers are waste, the dynamics of gas generation and transport in the cover layers are also material to evaluating LFG recovery. Two aspects are of interest, flux across the cover layers due to the pressure gradient between the conducting layer and the atmosphere, and that due to LFG generation within any waste serving as cover material:

The flux across the cover layer due to vacuum or pressure in the conducting layer is another key element of the analysis. This quantity is the component of air entrainment (or gas escape) and is determined by the pressure in the conducting layer. By equation B-1-2, given the calculated vacuum in the cover layer, the flux across a cover layer, assumed depth 200 cm and permeability 100 Darcys, is given as $$Qcov = 3.8 \times 10^{-5} \times (\Delta P_{COV})$$

Where $Q_{COV}$ = flux through cover, $cm^3/cm^2$-second.

If the surface layer is wholly or partially of waste, pressure due to self-generation within that waste must be considered to determine if it is a significant factor. Starting from an assumed boundary where flux is zero, and beyond which LFG generation occurs and moves vertically down through distance L, the overpressure due to generation at the boundary can be shown to be $$Pgen = SLFG = 1.78 \times 10^{-7} \times (13157/2D) \times L^2$$

Where Pgen is the overpressure from self-generated gas

SLFG is the specific generation rate of LFG, $cm^3/cm^3$-second and is $1.78 \times 10-7$ $cm^3/cm^3/sec$ D is permeability, Darcys=100 Darcys for waste For a cover consisting entirely of 2 m of waste (a limiting case) the pressure differential for a boundary condition of no flux at the upper surface can be calculated to be very low, at most 0.47 dynes/$cm^2$. This self-generated pressure exists but is realistically less (the cover is not all waste) and will be in most cases less than 0.47 dynes/$cm^2$ and of little consequence. The calculation indicates that gas generated within the cover layers and emitted amounts to less than 1% of the gas in an ideal case. One interesting aspect of this is that a bias amounting to at least this amount of vacuum beneath the cover would in the idealized case lead to capture all of the cover-generated gas that could otherwise be emitted.

With the vacuum over each examined increment of radius and corresponding area, the infiltrating atmospheric air can be calculated as shown in Table 3. With the infiltrating atmospheric air and collected gas calculated from Table 2, the total and composition of the collected gas is determined as shown in Table 3.

TABLE 2

Calculation of radial pressure gradients

| 2, M | R1, M | Plane area $R_1$ to $R_2$, $cm^2 \times 10^6$ | LFG R2 to R1 $cm^3$/sec $\times 10^{-6}$ | LFG cumulated total from Rm to R1 | LFG cumulated to (R2 + R1) | Transverse flow area_$cm^2$ (R2 + R1)/2 $\times$ cm high | Radial flux $Cm^3$ per $cm^2 \cdot$ sec | $\Delta P/\Delta L$ dynes $cm2 \cdot cm$ | Path length L cm | $\Delta P$ R2 to R1, dynes/$cm2$ | Total $\Delta P$ Rm to R1 (Vaccum) vs. $R_m$ and atmos. |
|---|---|---|---|---|---|---|---|---|---|---|---|
| 50 | 45 | $1.49 \times 10^6$ | 7952 cm3/sec | 7952 cm3/sec | 3976 cm3/sec | $1.49 \times 10^6$ | $2.68 \times 10^{-3}$ | $3.5 \times 10^{-5}$ | 500 cm | 0.017 dynes/$cm^2$ | 0.017 dynes/cm2 |
| 45 | 40 | $1.23 \times 10^6$ | 7114 cm3/sec | 15066 cm3/sec | 11509 cm3/sec | $1.335 \times 10^6$ $cm^2$ | $8.62 \times 10^{-3}$ | $1.13 \times 10^{-4}$ | 500 cm | .0565 dynes/$cm^2$ | .0765 dynes/$cm^2$ |
| 40 | 35 | $1.18 \times 10^6$ | 6277 cm3/sec | 21343 cm3/sec | 18204 cm3/sec | $1.178 \times 10^6$ $cm^2$ | $1.545 \times 10^{-3}$ | $2.03 \times 10^{-4}$ | 500 cm | .1015 dynes/$cm^2$ | 0.175 dynes/$cm^2$ |
| 35 | 30 | $1.02 \times 10^6$ | 5440 cm3/sec | 26783 cm3/sec | 24063 cm3/sec | $1.021 \times 10^6$ $cm^2$ | $2.36 \times 10^{-2}$ | $3.1 \times 10^{-4}$ | 500 cm | .155 dynes/$cm^2$ | 0.330 dynes/$cm^2$ |
| 30 | 25 | $.864 \times 10^6$ | 4603 cm3/sec | 31386 cm3/sec | 29084 cm3/sec | $0.864 \times 10^6$ $cm^2$ | $3.30 \times 10^{-2}$ | $4.34 \times 10^{-4}$ | 500 cm | .217 dynes/$cm^2$ | 0.547 dynes/$cm^2$ |
| 25 | 22 | $.754 \times 10^6$ | 2360 cm3/sec | 33746 cm3/sec | 32566 cm3/sec | $0.738 \times 10^6$ $cm^2$ | $4.41 \times 10^{-2}$ | $5.86 \times 10^{-4}$ | 300 cm | .174 dynes/$cm^2$ | 0.721 dynes/$cm^2$ |
| 22 | 20 | $.660 \times 10^6$ | 1406 cm3/sec | 35149 cm3/sec | 34447 cm3/sec | $0.616 \times 10^6$ $cm^2$ | $5.22 \times 10^{-2}$ | $6.87 \times 10^{-4}$ | 200 cm | .137 dynes/$cm^2$ | 0.858 dynes/$cm^2$ |
| 20 | 18 | $.597 \times 10^6$ | 1272 cm3/sec | 36421 cm3/sec | 35785 cm3/sec | $0.597 \times 10^6$ $cm^2$ | $5.99 \times 10^{-2}$ | $7.88 \times 10^{-4}$ | 200 cm | .157 dynes/$cm^2$ | 1.015 dynes/$cm^2$ |
| 18 | 16 | $.534 \times 10^6$ | 1138 cm3/sec | 37559 cm3/sec | 36990 cm3/sec | $0.534 \times 10^6$ $cm^2$ | $6.93 \times 10^{-2}$ | $9.12 \times 10^{-4}$ | 200 cm | .182 dynes/$cm^2$ | 1.197 dynes/$cm^2$ |
| 16 | 14 | $.470 \times 10^6$ | 1004 cm3/sec | 38563 cm3/sec | 38061 cm3/sec | $0.471 \times 10^6$ $cm^2$ | $8.08 \times 10^{-2}$ | $1.06 \times 10^{-3}$ | 200 cm | .212 dynes/$cm^2$ | 1.409 dynes/$cm^2$ |
| 14 | 12 | $.408 \times 10^6$ | 870 cm3/sec | 39433 cm3/sec | 38998 cm3/sec | $0.408 \times 10^6$ $cm^2$ | $9.56 \times 10^{-2}$ | $1.23 \times 10^{-3}$ | 200 cm | .246 dynes/$cm^2$ | 1.655 dynes/$cm^2$ |
| 12 | 10 | $.346 \times 10^6$ | 736 cm3/sec | 40169 cm3/sec | 39801 cm3/sec | $0.346 \times 10^6$ $cm^2$ | 0.115 | $1.51 \times 10^{-3}$ | 200 cm | .302 dynes/$cm^2$ | 1.957 dynes/$cm^2$ |
| 10 | 8 | $.282 \times 10^6$ | 603 cm3/sec | 40772 cm3/sec | 40470 cm3/sec | $0.283 \times 10^6$ $cm^2$ | 0.143 | $1.88 \times 10^{-3}$ | 200 cm | .376 dynes/$cm^2$ | 2.330 dynes/$cm^2$ |
| 8 | 6 | $.220 \times 10^6$ | 469 cm3/sec | 41241 cm3/sec | 41006 cm3/sec | $0.220 \times 10^6$ $cm^2$ | 0.186 | $2.45 \times 10^{-3}$ | 200 cm | .490 dynes/$cm^2$ | 2.823 dynes/$cm^2$ |
| 6 | 5 | $.173 \times 10^6$ | 151 cm3/sec | 41391 cm3/sec | 41315 cm3/sec | $0.173 \times 10^6$ $cm^2$ | 0.239 | $3.14 \times 10^{-3}$ | 100 cm | .314 dynes/$cm^2$ | 3.137 dynes/$cm^2$ |

TABLE 3

CALCULATION OF AIR ENTRAINMENT AND COMPARISON WITH LFG RECOVERY

| $R_2$ to $R_1$, Meters | R22-R12 | Area, cm2 | ΔP thru cover dynes/cm2 | Air flux thru cover = $3.8 \times 10^{-5}$ ΔP | Air infiltrat over area | Air infilt from R = Rm | Flow of LFG cm3/sec from R = Rm | % Air dilution |
|---|---|---|---|---|---|---|---|---|
| 50-45 | 475 | $14.9 \times 10^6$ | 0.017 | $6.5 \times 10^{-7}$ | 9.7 | 9.7 | 3976 | .24 |
| 45-40 | 425 | $13.35 \times 10^6$ | 0.0765 | $2.91 \times 10^{-6}$ | 38.8 | 48.5 | 11509 | .42 |
| 40-35 | 375 | $11.78 \times 10^6$ | 0.175 | $6.65 \times 10^{-6}$ | 78.33 | 126.8 | 18204 | .69 |
| 35-30 | 325 | $10.21 \times 10^6$ | 0.330 | $1.25 \times 10^{-5}$ | 127.6 | 254.4 | 24063 | 1.05 |
| 30-25 | 275 | $8.64 \times 10^6$ | 0.547 | $2.07 \times 10^{-5}$ | 178.8 | 433 | 29084 | 1.47 |
| 25-22 | 141 | $4.43 \times 10^6$ | 0.721 | $2.7 \times 10^{-5}$ | 119.6 | 552.8 | 32566 | 1.67 |
| 22-20 | 84 | $2.64 \times 10^6$ | 0.858 | $3.26 \times 10^{-5}$ | 86.1 | 639 | 34447 | 1.82 |
| 20-18 | 76 | $2.39 \times 10^6$ | 1.025 | $3.86 \times 10^{-5}$ | 92.1 | 731 | 35785 | 2.00 |
| 18-16 | 68 | $2.14 \times 10^6$ | 1.197 | $4.5 \times 10^{-5}$ | 96.1 | 827 | 36990 | 2.19 |
| 16-14 | 60 | $1.88 \times 10^6$ | 1.409 | $5.35 \times 10^{-5}$ | 101 | 928 | 38061 | 2.38 |
| 14-12 | 52 | $1.63 \times 10^6$ | 1.655 | $6.29 \times 10^{-5}$ | 102.5 | 1031 | 38998 | 2.57 |
| 12-10 | 44 | $1.38 \times 10^6$ | 1.957 | $7.43 \times 10^{-5}$ | 102.5 | 1133 | 39801 | 2.76 |
| 10-8 | 36 | $1.13 \times 10^6$ | 2.33 | $8.85 \times 10^{-5}$ | 100 | 1233 | 40470 | 2.96 |
| 8-6 | 28 | $0.88 \times 10^6$ | 2.823 | $1.07 \times 10^{-4}$ | 94.4 | 1327 | 41006 | 3.13 |
| 6-5 | 9 | $0.282 \times 10^6$ | 3.137 | $1.19 \times 10^{-4}$ | 30 | 1357 | 41315 | 3.18 |

The Example 2 case design and operational parameters were selected to be readily constructible and achievable. Table 3 shows excellent results for the example case. Exploitation of highly conductive layers could in this case result in LFG capture with minimal air entrainment (ca. 3% for the case of the example). At the same time, loss of LFG by fugitive emission to the atmosphere, is less than 1% of the total LFG generated over the control area or footprint. What is also important is that similarly excellent performance can be calculated as possible over a practically achievable and wide range of parameters.

On the other hand, the example results are for an "ideal case". There needs to be consideration of things that could get in the way. The performance of the example case, though excellent, is for an idealized case.

Dealing with Potential Problems.

Clearly, a number of circumstances could interfere and render LFG recovery less effective than the "ideal". But there are approaches and steps available that can lessen or solve foreseeable problems. The benefits of some steps in mitigating problems and improving recovery can in many cases be quantified. Below are listed some potential problems, remedial actions, and the effects of remedial actions.

1. Leaks. Leaks, or more exactly irregular gas conductivity or zones of high transmissivity in the cover material, could allow excessive air entrainment or gas escape.

Solution A. One solution for detecting leaks is to reduce LFG extraction, to result in net methane emission through the cover. The zones of methane emission will occur in more gas transmissive areas of the cover. Zones of high emissivity in the cover can be determined by tracking down emissions with LFG industry accepted methods such as flame ionization detector or via optical sensing of LFG, or other methods that may serve. When areas or zones of high emission are located, seal zones of high emission by cover with less permeable material such as soil.

Solution B (an example only). Additional strategically placed resistive layers or membranes to even very-near-surface resistance (while limiting lateral conductivity). A resistive membrane such as perforated polyethylene can be placed in the top cover layers, very near the surface (say 50% to 90% of the way "up" to the surface from the conducting layer. FIG. 5 is one example. Detail and specifications are omitted here but several other designs are possible). Such a layer would "even out" the vertical flux through cover layers and associated void volume that are otherwise heterogeneous in permeability.

A problem with this strategy could arise with tears in the membrane, but areas of high surface emission can be sealed as in solution A above Solution C. Boot over entrainment zone. A surface membrane, such as conventional LLDPE, can be placed over the surface of the landfill, aligned above the entrainment zone (around the well). This membrane will bar air infiltration over the area where the conducting area vacuum, and corresponding air infiltration would otherwise be highest. If the membranes cover 15% of the landfill surface, they will (by calculations similar to those of Table 3) roughly halve infiltration 2. Other strategies. As with 1. above, other strategies can help limit air entrainment or surface emission even if leaks or variations in gas conductivity are present in the cover. Mitigating approaches that can be taken, and effects, are as follows.

Approach:

D. Halve well spacing.

Quantified effect: Cuts air infiltration about fourfold. Also cuts emission similarly by a factor that depends on circumstances. Drawbacks are cost of extra wells E. Increase conductivity of conductive layer, by such means as increasing particle size.

Quantified effect: If for example the "equivalent sphere" size is doubled, conductivity is increased fourfold in laminar flow. See the Ergun equation in Note 1.

Drawback is possible difficulty in finding the appropriate large particle size waste in conducting layer.

F. Increase cover thickness over highly conductive layer:

Rough estimates of effect: Air infiltration would be decreased by the same factor that cover thickness is increased. Drawback is that lag time for control would be increased, and the effect of increasing cover thickness could be offset by irregularities in transmissivity.

Synergy of performance factors: Many of the performance mitigation steps above would be expected on fundamental principles to be multiplicative in their improvements. For example combining a step of cutting air entrainment/cover emissions by a factor of 2, by near surface membranes, and halving well spacing to cut air entrainment/cover emissions by a factor of 4, would (everything else being equal) cut these adverse phenomena by a factor of 2×4=8. Other performance enhancing strategies can be similarly multiplicative. What is obvious is that available strategies, taken together, can lessen or even eliminate any difficulties that may arise with use of highly conductive layers.

Note 1.

Calculation of Permeability of Highly Conductive Layer

Background on permeability: A Darcy is that amount of permeability allowing a flow of 1 cm/sec superficial velocity fluid having viscosity of 1 cp through a pressure gradient of 1 atmosphere per cm. The viscosity of LFG can be taken, to a close approximation, as $1.3 \times 10^{-4}$ poise, or about 1/70th that of water. This means that a 70-fold greater volumetric flow of LFG results from a given pressure gradient, compared to water, Adjusting for the assumed Darcy pressure gradient of 1 atmosphere gives flow rates of LFG as calculated below and also used in equations B-1-1, B-1-2 et seq.

For purposes of estimation of conductive layer permeability it can be assumed that LFG flow rate through the conducting layer is equivalent to LFG flow through a porous medium with flow resistance equal to packed spheres. The flow velocity typically lies within the broad transition range between laminar flow (Nre<1) and fully turbulent (Nre>1000) typical of packed beds. A well-validated correlation for pressure drop is needed. The inventors consider the one excellent applicable equation to be that giving the sum of the viscous and kinetic energy-related pressure losses in beds of particles, the Ergun equation (cited from McCabe and Smith, 1993):

$$\Delta P/\Delta L = 150\ Vs\mu(1-\epsilon)^2/\Phi^2 Dp2\epsilon^3 + 1.75\rho Vs^2(1-\epsilon)/\Phi Dp\epsilon^3$$

Where $\Delta P/\Delta L$=Pressure gradient in dynes/cm$^2$ per cm path length.

Vs=superficial LFG flow velocity based on empty cross section, cm/sec $\mu$=viscosity (LFG=$1.3 \times 10^{-4}$ Poise).

$\epsilon$=void fraction in porous layer, estimated from bulk density.

$\Phi$=shape factor, (1 for spheres).

Dp=particle diameter (an "equivalent sphere" can be defined for a porous matrix).

$\rho$=liquid density.

When cgs (cm/gram/second) units are used, this equation gives the pressure drop in terms of grams/cm$^2$ area per cm path length, useful in calculations in the text. Darcys are given as 13157 LVs/$\Delta$P where $\Delta$P is given as above.

For packed spheres of 1 cm diameter it can be established that the permeability of a conductive layer consisting of large packing equivalent to 1 cm spheres is about 6 million Darcys. For 0.5 cm diameter, it is the order of 1.5 million Darcys. With this finding, the conservative assumption in the text is a conducting layer permeability of (only) 1 million Darcys. This permeability would in fact appear attainable with a number of differing packings, including large wood chips, concrete rubble, shred/chip tires, or mixed C&D materials—among others.

REFERENCES and BIBLIOGRAPHY

Augenstein, D. and J. Pacey 1991 Landfill Methane Models. Proceedings, Wastecon Cincinnati Available from SWANA, Silver Spring, Md.

Augenstein, D. and Pacey, J. 1992 Landfill Gas Energy Utilization: Technology Options and Case Studies. US EPA Report EPA-600/R-92-116. Susan Thorneloe, EPA Project Officer Augenstein, D. R. Yazdani, J. Kieffer, H. Akau, J. Pacey and J. Benemann. 2003 Controlled Landfill Project, Yolo County, Calif. A Review of Results since 1994 Proceedings, 8$^{th}$ Landfill Symposium, Solid Waste Association of North America, (SWANA) SWANA, Silver Spring, Md.

Bentley, H. W., S. J. Smith, J. Tang, and G. Walter. 2002 A Method for Estimating the Rate of Landfill Gas Generation by Measurement and Analysis of Barometric Pressure Waves. Hydro Geo Chem. Inc. Tucson, Ariz. 85705.

Bingemer, H. and P. Crutzen 1987 The Production of Methane From Solid Wastes Journal of Geophysical Research v 92 p 2181

EMCON Associates. 1982. Methane Generation and Recovery from Landfills. Second Edition, Ann Arbor Science, Ann Arbor Mich.

Hughes, E. E. D. Augenstein and J. Benemann. 1994 Electricity from Biogas. Proceedings, Western Regional Biomass Symposium, available from US Department of Energy, 1994.

Huitric R. and V. Soni, 1997 Making the Most of Landfill Gas Projection Models Proceedings, 1997 Landfill Gas Symposium, Solid Waste Association of North America (SWANA) Silver Spring, Md.

Lu and Kunz, (1981) "Gas-flow Model to Determine Methane Recovery at Sanitary Landfills" Environmental Science and Technology, Volume 15, #4, April, 1981.

Peer, R. et al. *Approach for Estimating Global Landfill Methane Emissions* (EPA/600/S7-91/002), R. L. Peer et al. (Radian Corp., Research Triangle Park, N.C. 27709. April 1991. US National Technical Information Service: PB91-149534)

USEPA, 2002, Municipal Solid Waste in The United States 2000 Facts and Figures USEPA, 530 R-02-001 Office of Solid Waste and Emergency Response. June Vogt. W. G. and D. Augenstein 1997 A 19-Landfill Comparison of Models for Predicting Gas Recovery from Municipal Waste Landfills. Prepared for Solid Waste Association of North America (SWANA), and United States Department of Energy. SWANA, Silver Spring Md.

Walter, G. R. 2003 (Hydro Geo Chem, Inc.) Fatal Flaws in Measuring Landfill Gas Generation Rates by Empirical Well Testing. Journal of the Air and Waste Management Association.

Toshihiko Matsuto, 2004 "Air Permeability, Diffusion Coefficient and Tortuosity of Incineration Ash" from the Third Intercontinental Landfill Symposium (Sapporo, Japan, December).

Young, Alan. 1991 The Effects of Fluctuations in Atmospheric Pressure on Landfill Gas Migration and Composition. Water, Air and Soil Pollution vol. 64 p. 601.

All patents, patent documents, and other references cited are incorporated by reference.

What is claimed is:

1. A method of collecting biogas from a landfill having waste and an outer surface contacting the atmosphere, wherein the landfill contains (i) at or near the outer surface contacting the atmosphere a gas-containment layer that has low gas permeability; and (ii) a gas-permeable layer toward the interior of the landfill from the gas-containment layer and toward the exterior of most of the landfill waste mass, the gas-permeable layer having at least 10-fold the gas-permeability of the gas-containment layer;

the method comprising:

(a) collecting biogas from the landfill from a location toward the interior of the landfill from the gas-permeable layer with at least one gas-collection well that collects biogas from an extraction location toward the interior of the landfill from the gas-permeable layer and separated by waste from the gas-permeable layer and draws it to the surface, the well comprising a biogas-collecting wellhead at the extraction location and a gas-impermeable conduit linking the wellhead to the surface to draw biogas from the wellhead to the surface;

wherein if any biogas is collected directly from the gas permeable layer, it is less than 10% of the volume of biogas collected from the landfill from the extraction location toward the interior of the landfill through the at least one gas-collection well.

2. The method of claim 1 wherein the outer surface contacting the atmosphere is an upper surface of the landfill, the gas-permeable layer is underneath the gas-containment layer and above most of the landfill waste mass; and the biogas extraction location is underneath and separated by waste from the gas-permeable layer.

3. The method of claim 1 wherein if any biogas is collected directly from the gas permeable layer, it is less than 2% of the volume of biogas collected from the landfill from the extraction location located toward the interior of the landfill from the gas-permeable layer through the at least one gas-collection well.

4. The method of claim 1 wherein the area of the gas-permeable layer and the area of the gas-containment layer are each at least 50% of the landfill outer surface area contacting the atmosphere.

5. The method of claim 1 wherein the area of the gas-permeable layer and the area of the gas-containment layer are each at least 90% of the landfill outer surface area contacting the atmosphere.

6. The method of claim 1 wherein the gas-permeable layer has at least 1000-fold the gas permeability of the gas-containment layer.

7. The method of claim 1 wherein the gas-containment layer is predominantly soil.

8. The method of claim 1 wherein the gas-containment layer is predominantly clay.

9. The method of claim 1 wherein the gas-containment layer comprises a synthetic membrane.

10. The method of claim 1 wherein the gas-permeable layer comprises predominantly rigid or semi-rigid particles with an average particle diameter of 1 mm or greater, wherein gas-flow passages exist between the particles.

11. The method of claim 10 wherein the particles are gravel or pebbles.

12. The method of claim 10 wherein the particles are shredded tire, pieces of construction debris, paving debris, concrete chunks, wood debris, wood pallets, wood branches, wood logs, wood twigs, or wood chips.

13. The method of claim 1 wherein the gas-permeable layer comprises a network of apertured conduits oriented generally parallel to the surface contacting the atmosphere.

14. The method of claim 1 further comprising adding moisture or nutrients or both to the landfill mass to promote biogas formation in the landfill.

15. The method of claim 1 further comprising heating a portion or the whole of the landfill mass to promote biogas formation in the landfill.

16. A method of collecting biogas from a landfill wherein the landfill has an outer surface contacting the atmosphere, the method comprising:

providing the landfill at or near the outer surface contacting the atmosphere with a gas-containment layer that has low gas permeability;

providing the landfill with a gas-permeable layer toward the interior of the landfill from the gas-containment layer and toward the exterior of most of the landfill waste mass, the gas-permeable layer having at least 10-fold the gas-permeability of the gas-containment layer;

providing the landfill with at least one gas-collection well that collects biogas from an extraction location toward the interior of the landfill from the gas-permeable layer and separated by waste from the gas-permeable layer and draws it to the surface, the well comprising a biogas-collecting wellhead at the extraction location and a gas-impermeable conduit linking the wellhead to the surface to draw biogas from the wellhead to the surface; and collecting biogas from the landfill toward the interior of the landfill from the gas-permeable layer through the at least one gas-collection well;

wherein if any biogas is collected directly from the gas permeable layer, it is less than 10% of the volume of biogas collected from the landfill from the extraction location toward the interior of the landfill through the at least one gas-collection well.

* * * * *